Patented June 3, 1930

1,761,633

UNITED STATES PATENT OFFICE

RICHARD F. KRAUSE, OF MASSILLON, OHIO

DRIP-COFFEE MAKER

Application filed December 9, 1929. Serial No. 412,718.

The invention relates to coffee pots for making drip coffee by the leaching action of boiling water upon the ground coffee.

Devices for the making of drip coffee are well known, in which a ground coffee container, provided with a perforate bottom wall, is suspended within the upper portion of a pot and supports above the same a water reservoir having sundry minute perforations in its bottom, whereby boiling water placed in the water reservoir will be gradually supplied to the ground coffee for leaching the same to extract the strength therefrom, the coffee beverage dripping from the perforate bottom of the coffee container into the pot.

Such structures as are above referred to usually include a ground coffee container of at least the diameter of the water reservoir, and it has been found that with such a construction there is a tendency for the boiling water, from the water receptacle, to pass downward through the central portion only of the ground coffee, thus losing a considerable portion of the strength of the coffee.

The object of the present improvement is to overcome the objections to the usual form of drip coffee makers, by confining the dry ground coffee to a smaller space, thereby making it necessary for all of the boiling water to pass through substantially all of the ground coffee; to bring about a stronger and more complete extraction of the coffee flavor and aroma from the ground coffee; to provide a novel means of attaching the ground coffee container to the water reservoir; to provide a structure whereby the coffee container will be removed from the pot with the water reservoir; and to generally improve and simplify drip coffee makers.

The above and other objects may be attained by providing a water reservoir adapted to be seated in the upper end of a pot; and a ground coffee container of considerably smaller diameter than the water reservoir and tapered toward its lower end, to confine the dry coffee grounds to a small space; and to provide means for detachably securing the open upper end of the coffee container to the perforate bottom of the water reservoir, in such a manner that the two members may be inserted into or removed from the pot as a unit.

Figure 1:
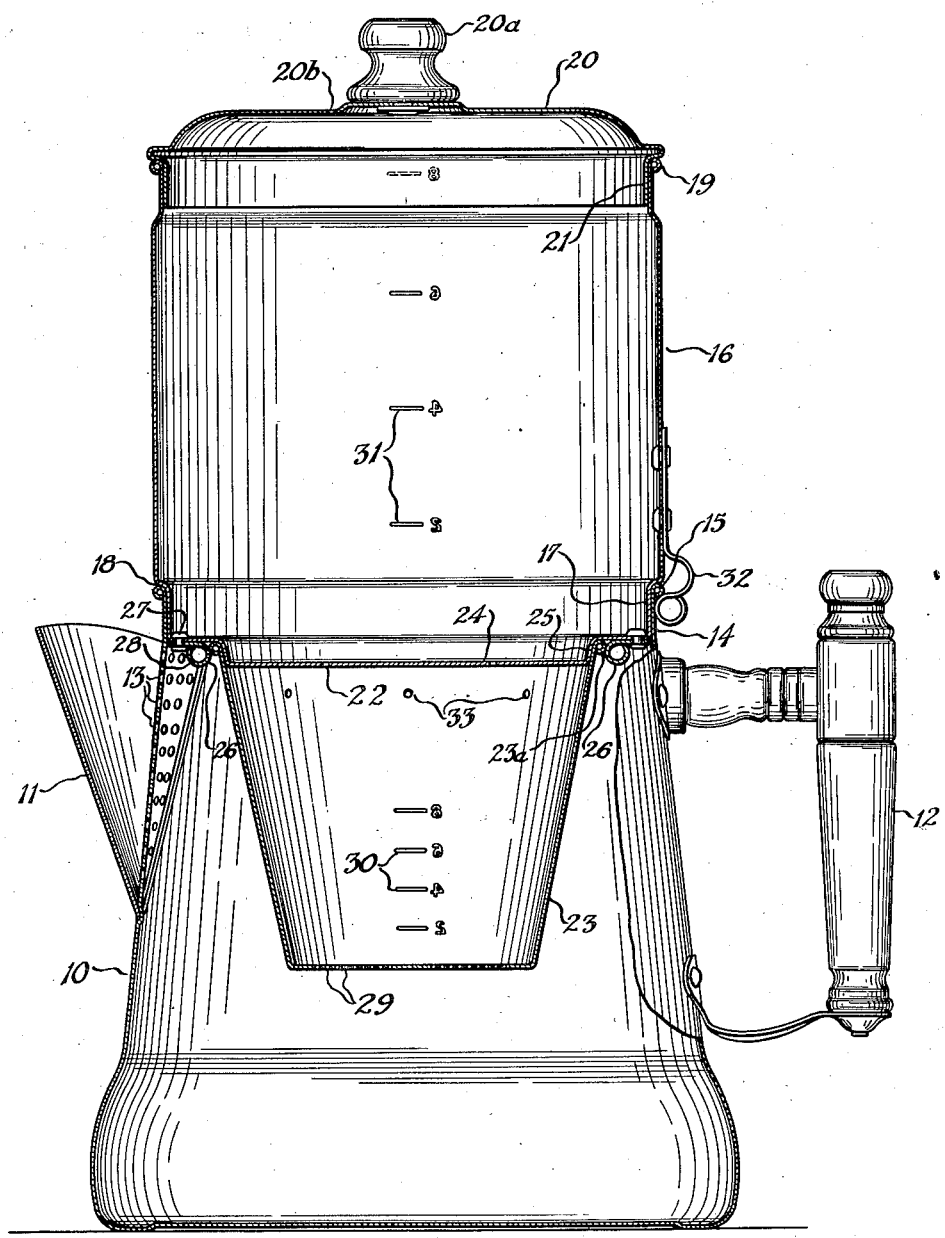
Figure 2:
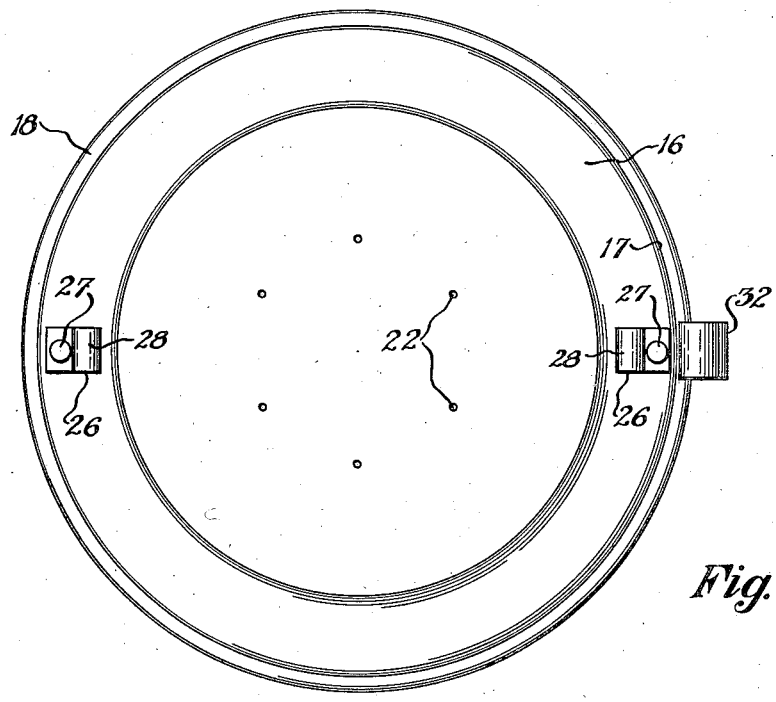

An embodiment of the invention is illustrated in the acompanying drawings, in which Figure 1 is a vertical sectional view through the imroved drip coffee maker;

Fig. 2, a bottom plan view of the water reservoir; and

Figure 3:
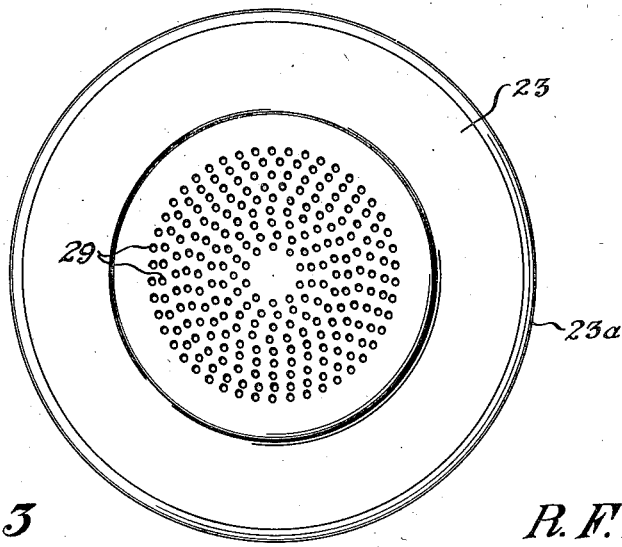

Fig. 3, a similar view of the ground coffee container.

Similar numerals refer to similar parts throughout the drawings.

The coffee beverage receiving and dispensing pot 10 may be of the general design of the usual coffee pot and provided with the pouring spout 11 and handle 12, the spout communicating with the interior of the pot as through a plurality of perforations 13, and the handle being connected to the side wall of the pot, diametrically opposite to the spout to provide for easily handling the pot and pouring the contents therefrom through the spout in the usual manner. The upper open end of the pot may be provided with the reduced, substantially cylindric neck 14 having the usual rim bead 15 at its upper edge.

The water reservoir 16 is provided at its lower end with the reduced, substantially cylindric portion 17 adapted to fit snugly within the reduced neck 14 of the pot, the annular shoulder 18 of the reservoir resting upon the peripheral bead 15 of the pot. The upper open end of the water reservoir may be of the same diameter as the reduced neck 14 of the pot and is preferably provided with the peripheral bead 19.

The cover 20 has the depending annular flange 21 adapted to be received in the upper open end of the reservoir and since the neck 14 is of the same diameter, the cover may be placed directly upon the pot when the reservoir is removed.

A handle knob 20ª is preferably provided upon the cover for the purpose of placing the same upon the water reservoir or pot and removing it therefrom, and for the purpose of preventing the formation of a vacuum within the water reservoir, and to permit the boiling water to flow therefrom, an air vent 20ᵇ may be provided in the cover.

The bottom wall of the water reservoir is provided with a spaced plurality of minute apertures 22 to permit the boiling water to pass from the same at a controlled rate of speed into the mass of ground coffee in the coffee container 23 which is of considerably less diameter than the water reservoir and tapered from top to bottom, as illustrated in the drawings.

The ground coffee container is adapted to be detachably connected to the lower end of the water reservoir so that it may be placed upon or removed from the pot as a unit with the reservoir. This connection between these two parts may be made in many different ways but is preferably accomplished in the manner shown in the drawings by providing a depending annular portion 24 pressed downward from the central part of the bottom of the water reservoir and tapered as at 25 to conform to the taper of the coffee receptacle, whereby the upper open end of the coffee receptacle may wedge fit the depending portion 24 of the reservoir.

A peripheral bead 23ᵃ is preferably provided at the upper open end of the coffee container and for the purpose of further assisting in retaining the coffee container upon the water reservoir, spring clips 26 may be attached to the bottom wall of the water reservoir as by rivets 27 or the like and provided with the curved end portions 28 for engagement under the bead 23ᵃ of the coffee container.

The bottom wall of the coffee container 23 is perforate, being preferably provided with a plurality of spaced apertures 29, of suitable size and number to properly regulate the flow of the coffee beverage from the coffee container into the pot.

The coffee container may be provided with graduations shown at 30 to indicate the amount of ground coffee to be placed therein to make any desired number of cups of coffee beverage and in the same manner graduations 31 may be provided upon the side wall of the water reservoir to indicate the amount of boiling water necessary to produce the desired amount of coffee beverage.

In order to permit pouring of the coffee beverage from the receiving and dispensing pot without the necessity of removing the water reservoir and ground coffee container, a spring catch 32 is provided upon the water reservoir and adapted to fit over the rim bead 15 of the pot, in the position shown in Fig. 1 of the drawings, thus preventing the accidental disengagement of the water reservoir from the pot when the same is tilted to pour the beverage therefrom.

When it is desired to use the improved coffee maker for making drip coffee, the proper amount of ground coffee is placed in the coffee container and the same is then attached to the lower end of the water reservoir which is then placed in position upon the pot 10, as shown in Fig. 1. The cover 20 is removed from the water receptacle and the desired amount of boiling water is poured into the reservoir, after which the cover may be replaced thereon.

The boiling water will be discharged from the reservoir through the minute openings 22 into the mass of ground coffee in the coffee container 23, being gradually supplied thereto in the proper quantity for extracting the strength from the ground coffee after which it will drip through the apertures 29, in the bottom of the coffee container into the pot.

Owing to the reduced size of the coffee container, substantially all of the boiling water passes through all of the mass of ground coffee which is confined in the reduced lower portion of the coffee container.

In the event there is any ebullition or effervescence of the water and foam in the coffee container, caused by the first contact of the boiling water with the ground coffee, the same may overflow the coffee container and drain into the pot.

If desired, a few small apertures may be located near the upper end portion of the coffee container, as indicated at 33, to assist in quickly relieving this condition and as soon as this ebullition or effervescence subsides, the leaching action will continue without further ebullition or effervescence, the boiling water passing through substantially all of the ground coffee and dripping into the pot.

From the above it will be seen that the dry ground coffee is confined to a small space, making it necessary for the boiling water to pass through substantially all of the ground coffee, whereby a stronger and more complete extraction of the coffee flavor and aroma from the ground coffee is produced.

The coffee maker illustrated in the drawings is of a size to produce eight cups of coffee beverage but it will be seen that by providing the reduced coffee container to confine the ground coffee and cause the boiling water to pass through substantially all of the coffee, one or two cups of coffee beverage may be made of equal strength to the full capacity of the coffee maker.

I claim:

1. A drip coffee maker including a water reservoir having a reduced, central, depending portion in its bottom wall having apertures therein, and a coffee container, of smaller diameter than the water reservoir, arranged to have its upper open end frictionally fit upon the reduced portion of the reservoir, the coffee container having a perforate bottom wall.

2. A drip coffee maker including a water reservoir having a reduced, central, depending portion in its bottom wall having apertures therein, a coffee container, of smaller diameter than the water reservoir, arranged to have its upper open end frictionally fit upon the reduced portion of the reservoir, the coffee container having a perforate bottom wall, a rim bead at the upper open end of the coffee container, and spring clips upon the water reservoir for engaging said bead.

3. A drip coffee maker including a water reservoir having a reduced, central, depending portion in its bottom wall having apertures therein, and a coffee container, of smaller diameter than the water reservoir and tapered toward its lower end, arranged to have its upper open end frictionally fit upon the reduced portion of the reservoir, the coffee container having a perforate bottom wall.

4. A drip coffee maker including a water reservoir having a reduced, central, depending portion in its bottom wall having apertures therein, a coffee container, of smaller diameter than the water reservoir and tapered toward its lower end, arranged to have its upper open end frictionally fit upon the reduced portion of the reservoir, the coffee container having a perforate bottom wall, a rim bead at the upper open end of the coffee container, and spring clips upon the water reservoir for engaging said bead.

5. A drip coffee maker including a water reservoir having apertures in its bottom wall, a coffee container of smaller diameter at its upper end than the lower end of the water reservoir and having a rim bead at its upper open end, the upper end of the coffee receptacle contacting with the bottom wall of the water reservoir, and spring clips upon the bottom of the water reservoir for engaging said bead, the coffee container having a perforate bottom portion.

6. A drip coffee maker including a water reservoir having apertures in its bottom wall, a coffee container of smaller diameter at its upper end than the lower end of the water reservoir and tapered toward its lower end and having a rim bead at its upper open end, the upper end of the coffee receptacle contacting with the bottom wall of the water reservoir, and spring clips upon the bottom of the water reservoir for engaging said bead, the coffee container having a perforate bottom portion.

In testimony that I claim the above, I have hereunto subscribed my name.

RICHARD F. KRAUSE.